United States Patent
Nakajima et al.

(10) Patent No.: US 6,352,752 B1
(45) Date of Patent: Mar. 5, 2002

(54) RESIN COMPONENT

(75) Inventors: Atsushi Nakajima; Tsutomu Amano; Yusuke Genno, all of Nagano (JP)

(73) Assignee: Nissin Kogyo Co., LTD, Nagano-Ken (JP)

( * ) Notice: Subject to any disclaimer, the term of this patent is extended or adjusted under 35 U.S.C. 154(b) by 0 days.

(21) Appl. No.: 09/460,989

(22) Filed: Dec. 15, 1999

(30) Foreign Application Priority Data

Dec. 16, 1998 (JP) .......................................... 10-358180

(51) Int. Cl.⁷ ............................... B32B 3/02; B32B 3/10
(52) U.S. Cl. ......................................................... 428/60
(58) Field of Search ..................................... 428/57, 60

(56) References Cited

U.S. PATENT DOCUMENTS

| | | | |
|---|---|---|---|
| 4,601,927 A | 7/1986 | Durfee | |
| 4,919,987 A | * 4/1990 | Manner | 428/60 |

FOREIGN PATENT DOCUMENTS

| | | | |
|---|---|---|---|
| DE | 42 44 017 A1 | 6/1994 | |
| FR | 2 713 540 | 6/1995 | |
| JP | 10-193460 | 7/1998 | |

* cited by examiner

*Primary Examiner*—Alexander S. Thomas
(74) *Attorney, Agent, or Firm*—McGuireWoods LLP (57) ABSTRACT

A first molded body 61 comprises a joint area 63, a first regulating projection 64 and a first guide surface 65 connecting an internal side surface of the first regulating projection 64 to the joint area 63, and a second molded body 62 comprises a welding projection 66 constructed to be welded to the joint area 63 at a distal end thereof, a second regulating projection 67 constructed to closely confront the first regulating projection when vibration welding of the welding projection 66 to the joint area 63 is completed and a second guide surface connecting an external side surface of the welding projection to an internal side surface of the second regulating projection 67. Burrs produced during vibration welding of the welding projection 66 to the joint area 63 are guided by the first surface 65 toward the internal side surface of the second regulating projection 67 along the internal side surface of the first regulating projection 64, and then are further guided by the second guide surface 68 toward the external side surface of the welding projection 66.

7 Claims, 9 Drawing Sheets

RESIN COMPONENT

BACKGROUND OF THE INVENTION

The present invention relates to a resin component formed by vibration welding together first and second molded bodies that are both molded from a synthetic resin.

Conventionally, the aforesaid resin component is known in, for instance, Japanese Patent Unexamined Publication No. Hei. AK7-266425, and in the resin component disclosed therein, in order to prevent a damage to the commercial value of the resin component by burrs that are produced to be exposed from an external surface of the resin component when the fist and second molded bodies are vibration welded together, a flat joint area is provided on one of the two molded bodies, while provided on the other molded body are a welding projection adapted to be vibration welded to the joint area at a distal end thereof and a regulating projection disposed outwardly of the vibration welding portion and adapted to abut against the joint area when vibration welding of the vibration welding portion to the joint area is completed, so that burrs produced to project outwardly when the welding projection is vibration welded to the joint area are contained within a space formed between the welding projection and the regulating projection to thereby be prevented from exposure to the outside.

In the above-described conventional resin component, since there exists a gap between the regulating projection and the joint area before the vibration welding is completed, burrs produced in conjunction with vibration welding of the welding projection to the joint area before the vibration welding is completed are guided by the flat guide surface to be exposed to the outside through the gap, this leading to a possibility that the burrs are exposed to the outside or held between the regulating projection and the joint area after the vibration welding is completed, thus it being not possible to securely prevent the exposure of the burrs to the outside.

SUMMARY OF THE INVENTION

The present invention was made in view of the problem described above, and an object thereof is to provide a resin component in which exposure of burrs produced when first and second molded bodies are vibration welded to the outside is securely be prevented to thereby improve the commercial value of the resin component.

The above-mentioned object can be achieved by a resin component according to the present invention comprising a first synthetic resin molded body and a second synthetic resin molded body coupled with the first synthetic resin molded body by a vibration welding. The first resin molded body includes an joint area which is provided at its edge portion where the first molded body is joined to the second molded body, a first regulating projection which is provided from an outermost edge of the joint area toward the second molded body, and a first guide surface connecting an internal side surface of the first regulating projection to the joint area. The second resin molded body includes a welding projection which is projected toward the first molded body so as to be welded at a distal end thereof to the joint area of the first molded body and is provided at its edge portion where the second molded body is jointed to the first molded body, a second regulating projection which is projected from an outermost edge of the second molded body toward the first molded body so as to closely confront the first regulating projection after a vibration welding operation between the welding projection and the joint area is completed, and a second guide surface connecting an external surface of the welding projection to an internal side surface of the second regulating projection.

In the resin component according to the present invention, it is preferable that the first guide surface is formed into a curve shape to guide a burr produced to project toward the first regulating projection as a result of vibration welding of the welding projection to the joint area toward the internal side surface of the second regulating projection along the internal side surface of the first regulating projection, and the second guide surface is curved and located in confront with the first guide surface so as to guide the burr guided from the internal side surface of the first regulating projection to the internal side surface of the second regulating projection toward the external side surface of the welding projection.

In addition, in the resin component according to the present invention, it is also preferable that each of the joint area, the first regulating projection, the welding projection and the second regulating projection is formed into an endless shape.

Further, in the resin component according to the present invention, it is advantageous that the distal end of the welding projection has a cross section substantially formed by two line one of which is inclined relative to a direction extended perpendicular to the joint area by a first predetermined angle ($\alpha$) and the other of which is extended along or inclined relative to the direction by a second predetermined angle ($\beta$) smaller than the first predetermined angle.

Moreover, in order to attaining the above object, according to the present invention, there is provided a resin component formed by vibration welding together first and second molded bodies that are molded from a synthetic resin, wherein there are provided at an edge portion of the first molded body where the first molded body is joined to the second molded body an endless joint area, a first endless regulating projection projecting from an outer edge of the joint area toward the second molded body and a first guide surface connecting an internal side surface of the first regulating projection to the joint area, wherein there are provided at an edge portion of the second molded body where the second molded body is jointed to the first molded body, an endless welding projection projecting toward the first molded body in such a manner as to be welded at a distal end thereof to the joint area of the first molded body, a second endless regulating projection projecting from an outer edge of the second molded body toward the first molded body in such a manner as to closely confront the first regulating projection when vibration welding of the welding projection to the joint area is completed and a second guide surface connecting an external side surface of the welding projection to an internal side surface of the second regulating projection, the first guide surface being curved convexedly outwardly in such a manner as to guide a burr produced to project toward the first regulating projection as a result of vibration welding of the welding projection to the joint area toward the internal side surface of the regulating projection along the internal side surface of the first regulating projection, and the second guide surface being curved convexedly to aside opposite to the first guide surface in such a manner as to guide the burr guided from the internal side surface of the first regulating projection to the internal side surface of the second regulating projection toward the external side surface of the welding projection.

According to the above construction, the first and second molded bodies are vibrated relative to each other at a high speed with the distal end of the welding projection of the second molded body being pressed against the joint area of the first molded body, whereby the distal end of the welding projection is vibration welded to the joint area by a friction heat produced between the distal end of the welding projection and the joine area to thereby construct the resin component. Of burrs produced at a contact portion between the distal end of the welding projection and the joint area during this vibration welding, those projecting outwardly are guided by the first guide surface along the internal side surface of the first regulating projection toward the second regulating projection, and furthermore burrs guided from the internal side surface of the first regulating projection to the internal side surface of the second regulating projection are then guided toward the external side surface of the welding projection by the second guide surface, and therefore the burrs are prevented from project outwardly from the gap between the first and second regulating projections and instead they are destined to be confined within the space formed by the joint area, the first regulating projection, the second regulating projection and the welding projection, whereby exposure of the burrs from the external surface of the resin component is securely prevented, this thereby contributing to the improvement of the commercial value of the resin component so formed.

DETAILED DESCRIPTION OF THE PREFERRED EMBODIMENTS

A mode of carrying out the present invention will be described below based on an embodiment according to the present invention shown in the accompanying drawings.

Figure 1:
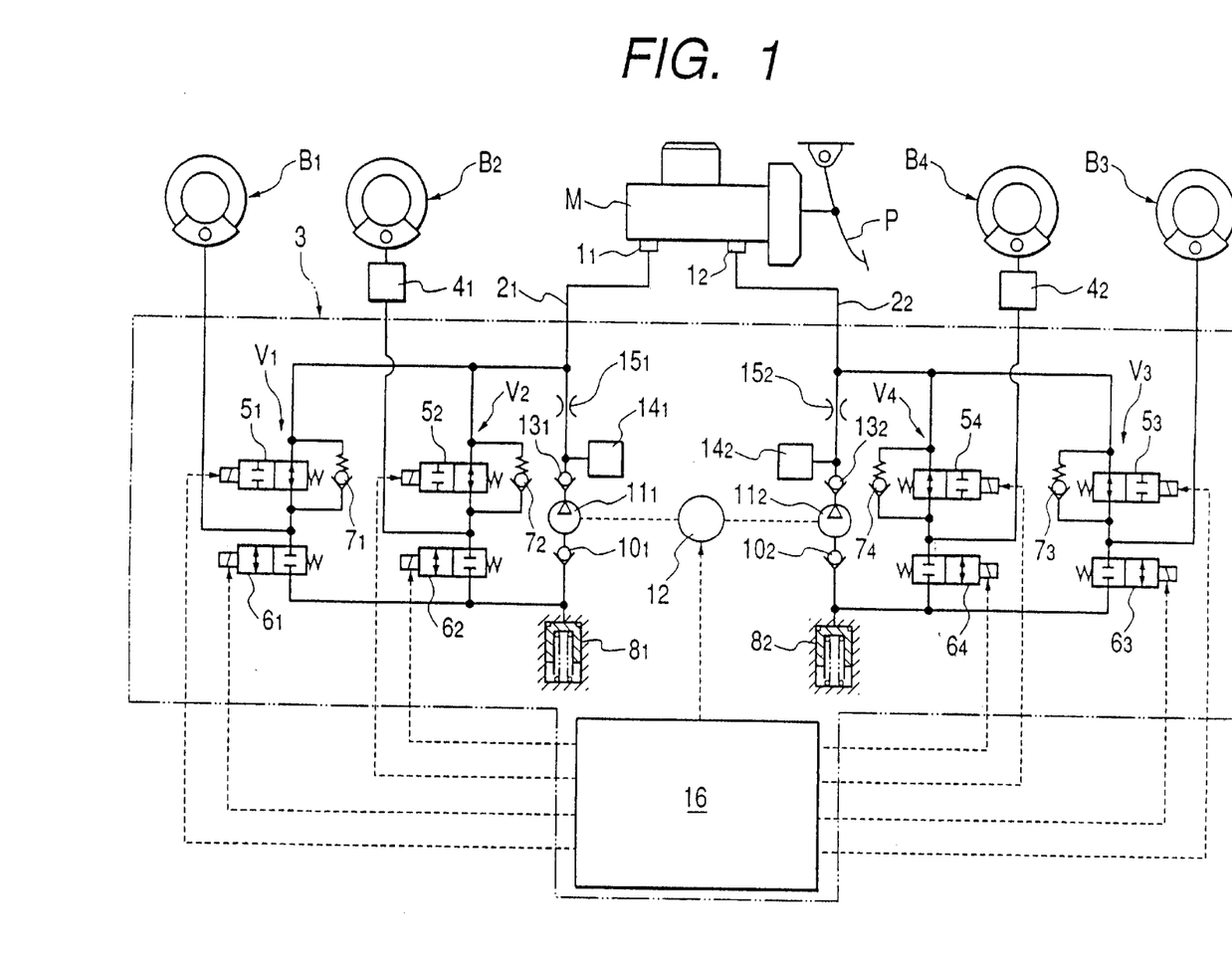
FIG. 1 shows a brake fluid pressure circuit diagram of a brake system for a passenger vehicle.
Figure 2:
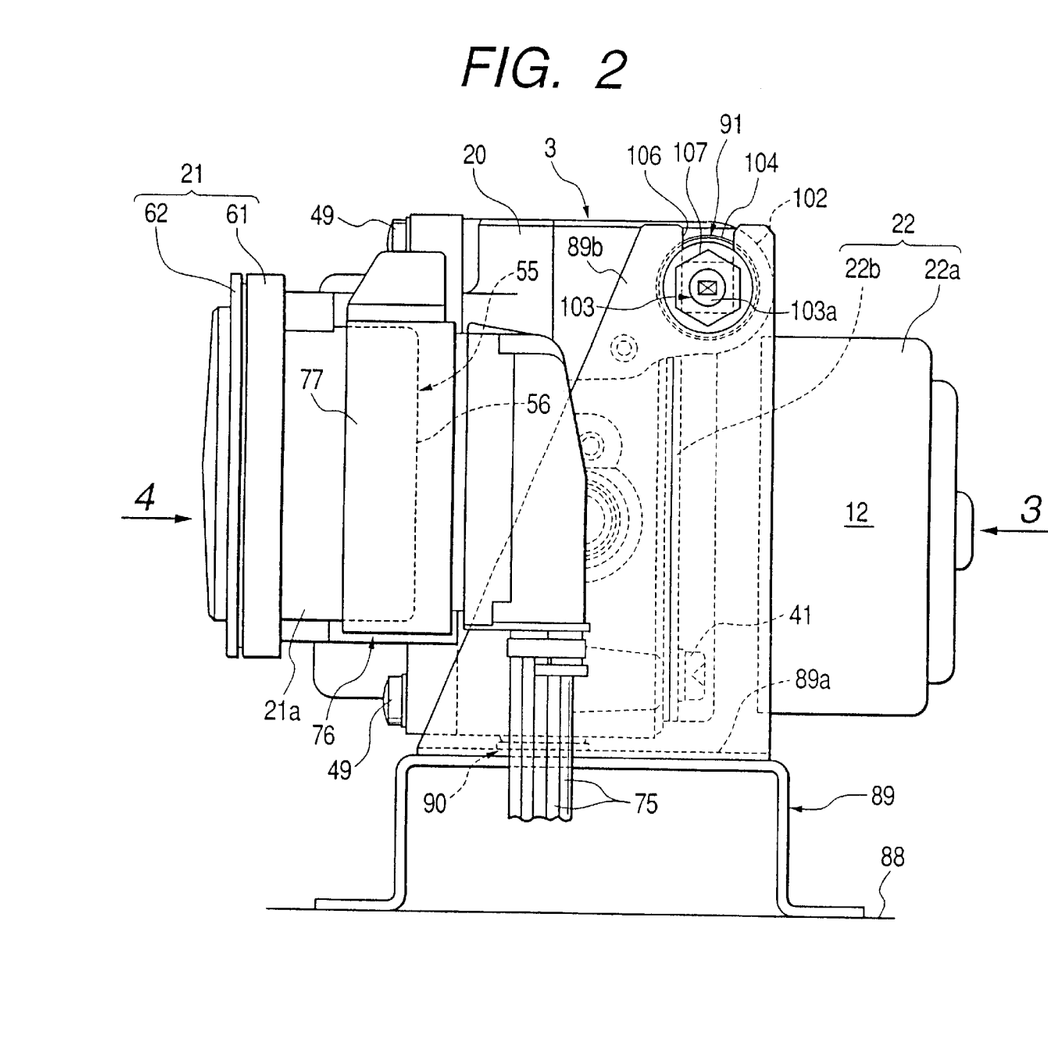
FIG. 2 shows a side view of the brake fluid pressure control device.
Figure 3:
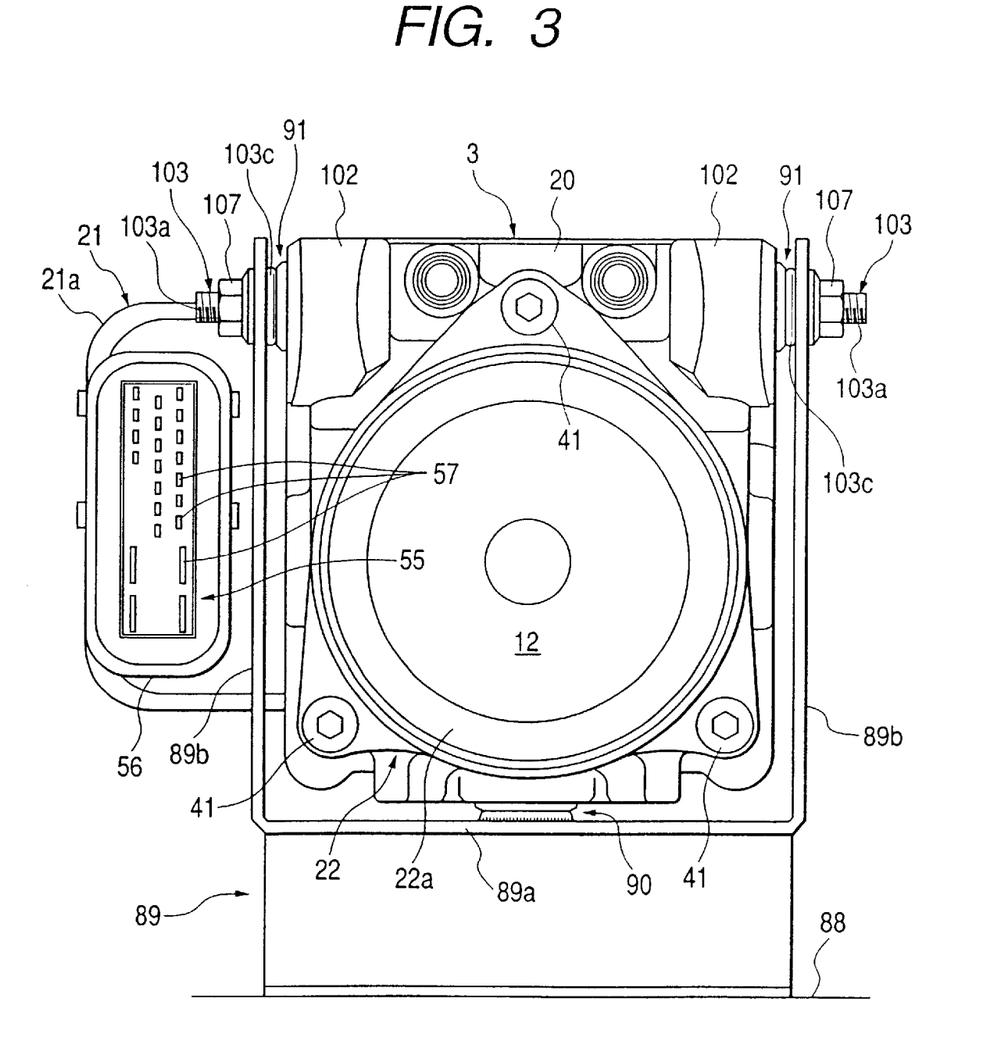
FIG. 3 shows a view seen in a direction indicated by an arrow 3 in FIG. 2.
Figure 4:
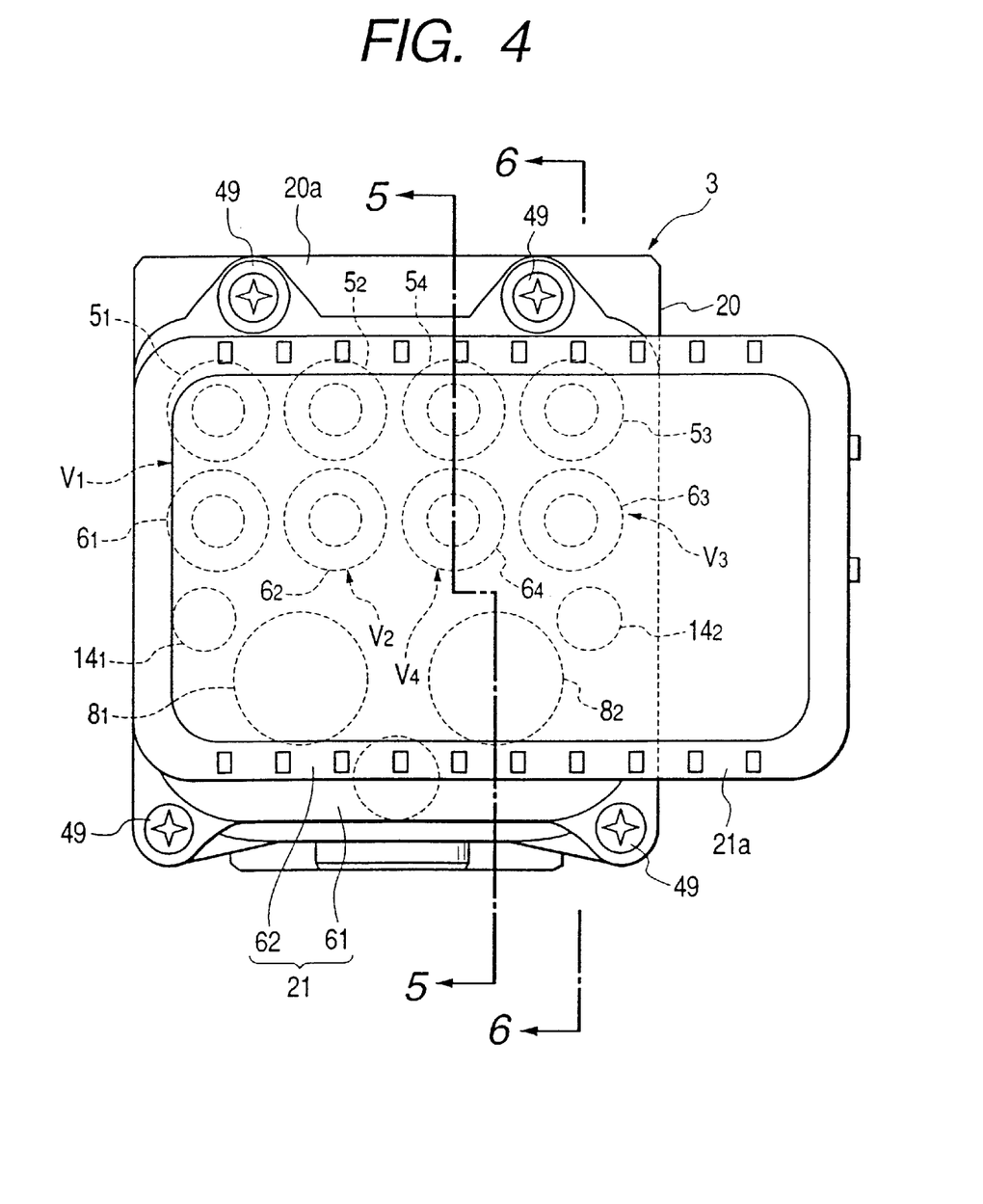
FIG. 4 shows a view seen in a direction indicated by an arrow 4 in FIG. 2.
Figure 5:
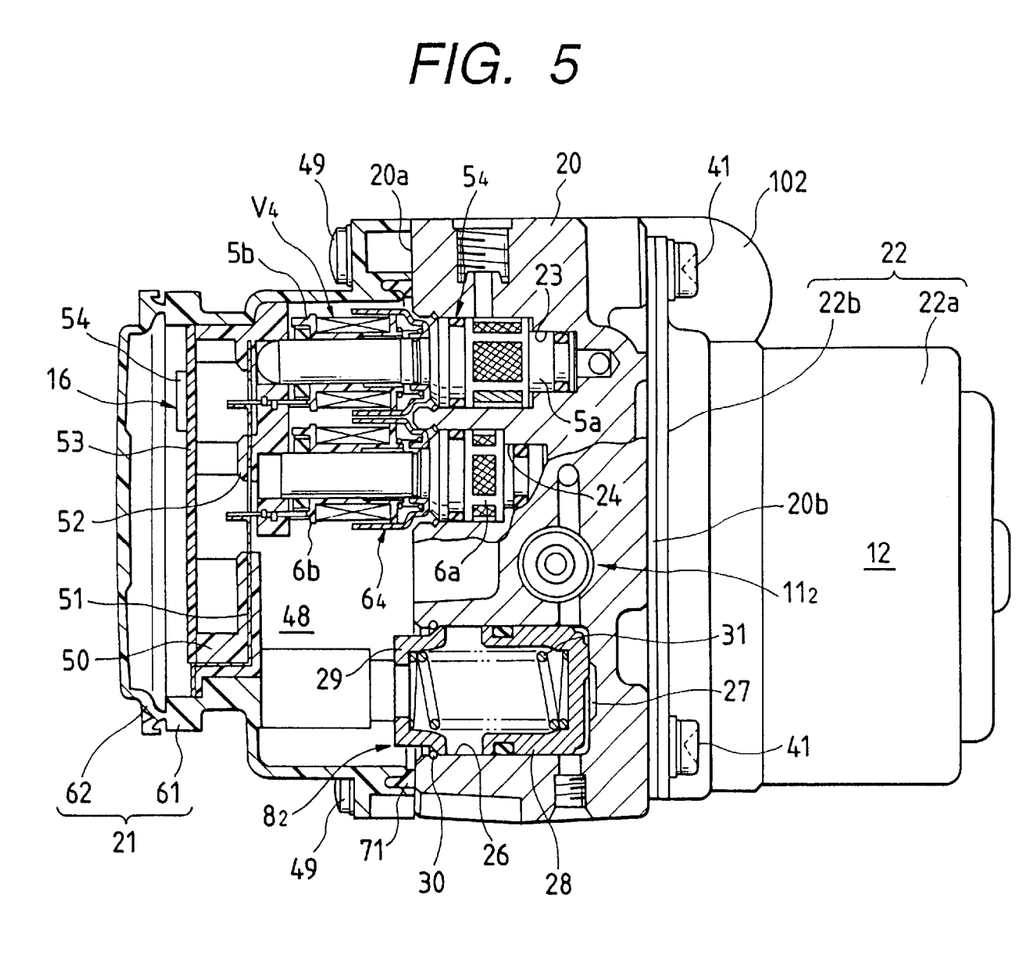
FIG. 5 shows a sectional view taken along the line 5—5 of FIG. 4.
Figure 6:
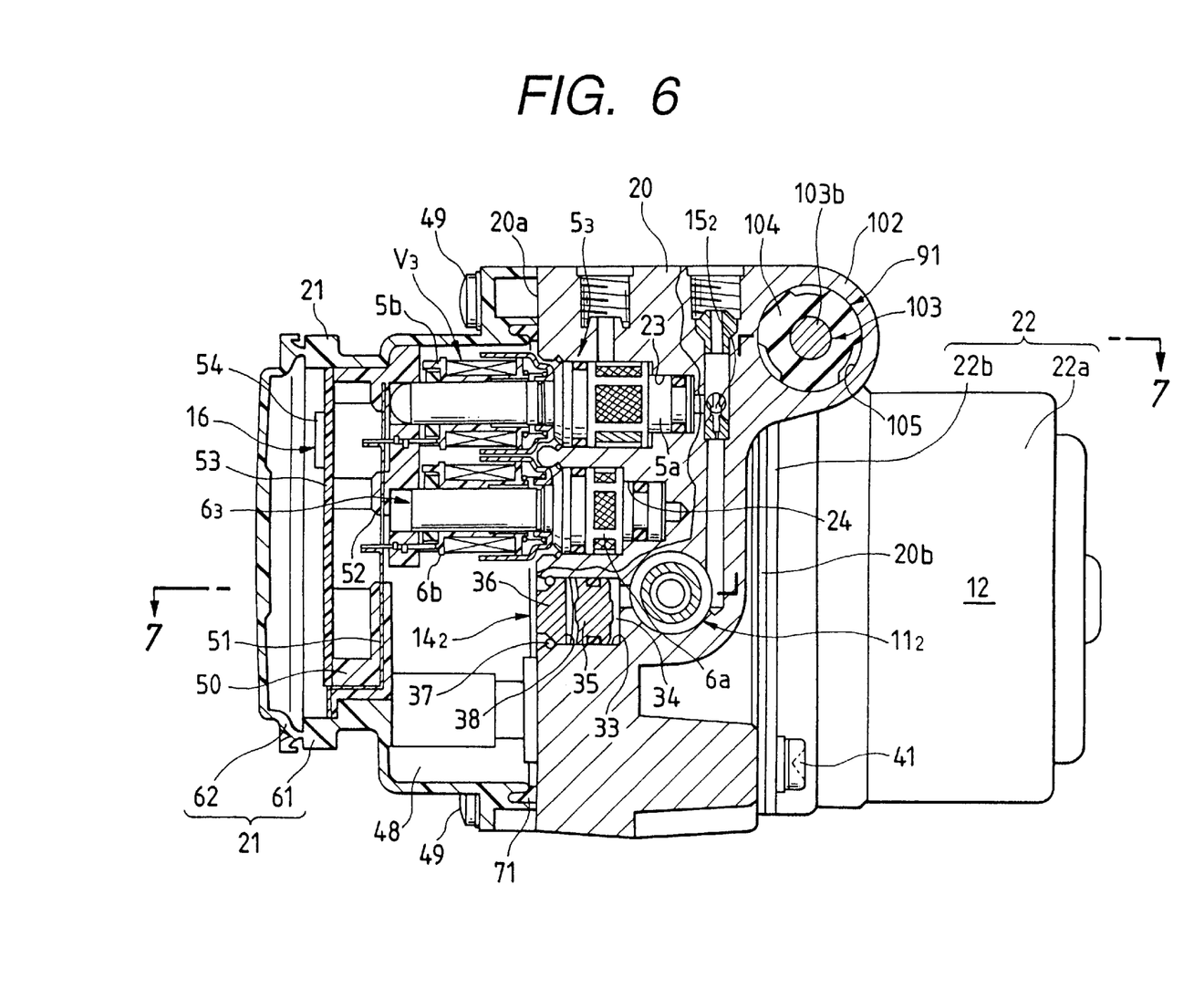
FIG. 6 shows a sectional view taken along the line 6—6 of FIG. 4.
Figure 7:
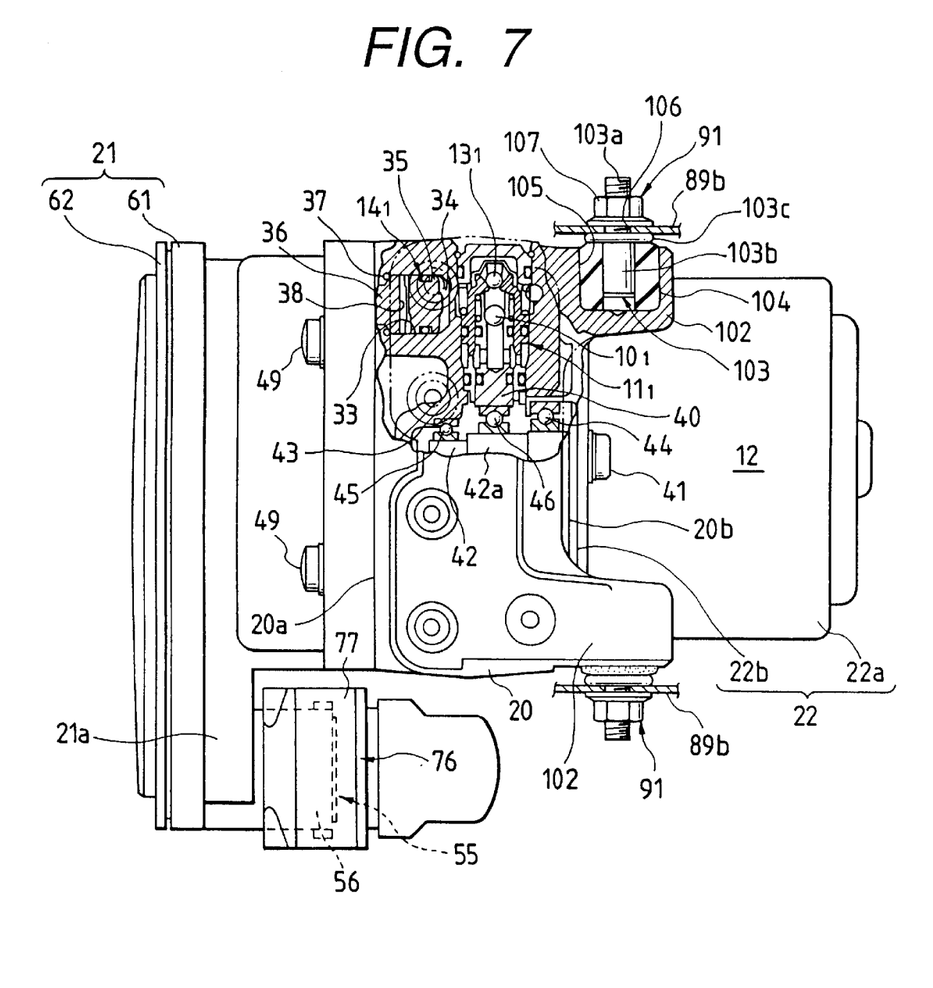
FIG. 7 shows a sectional view taken along the line 7—7 of FIG. 6.
Figure 8:
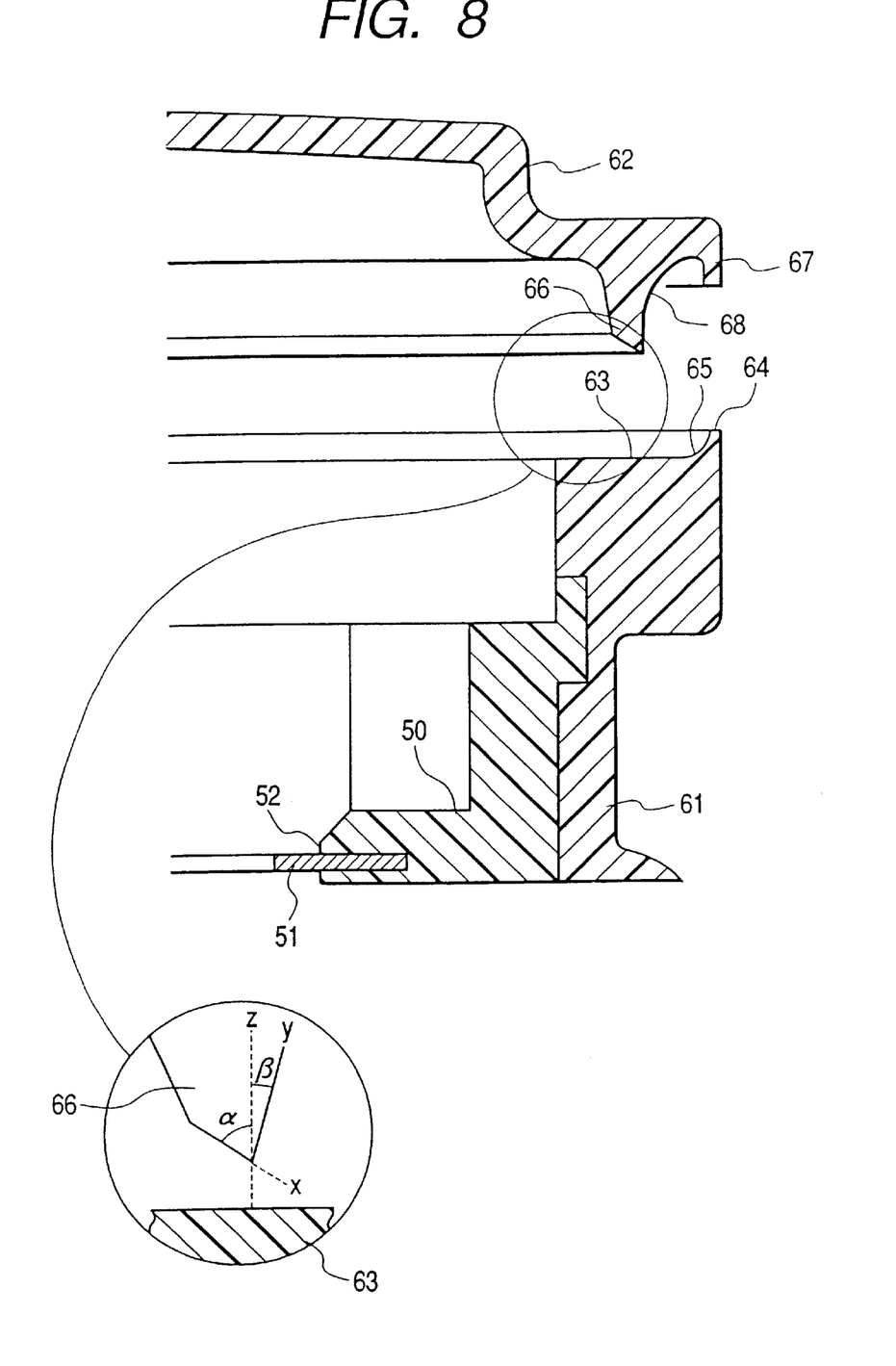
FIG. 8 shows a vertical sectional view showing a main part of a cover before constituent parts of the cover have not yet been welded together.
Figure 9:
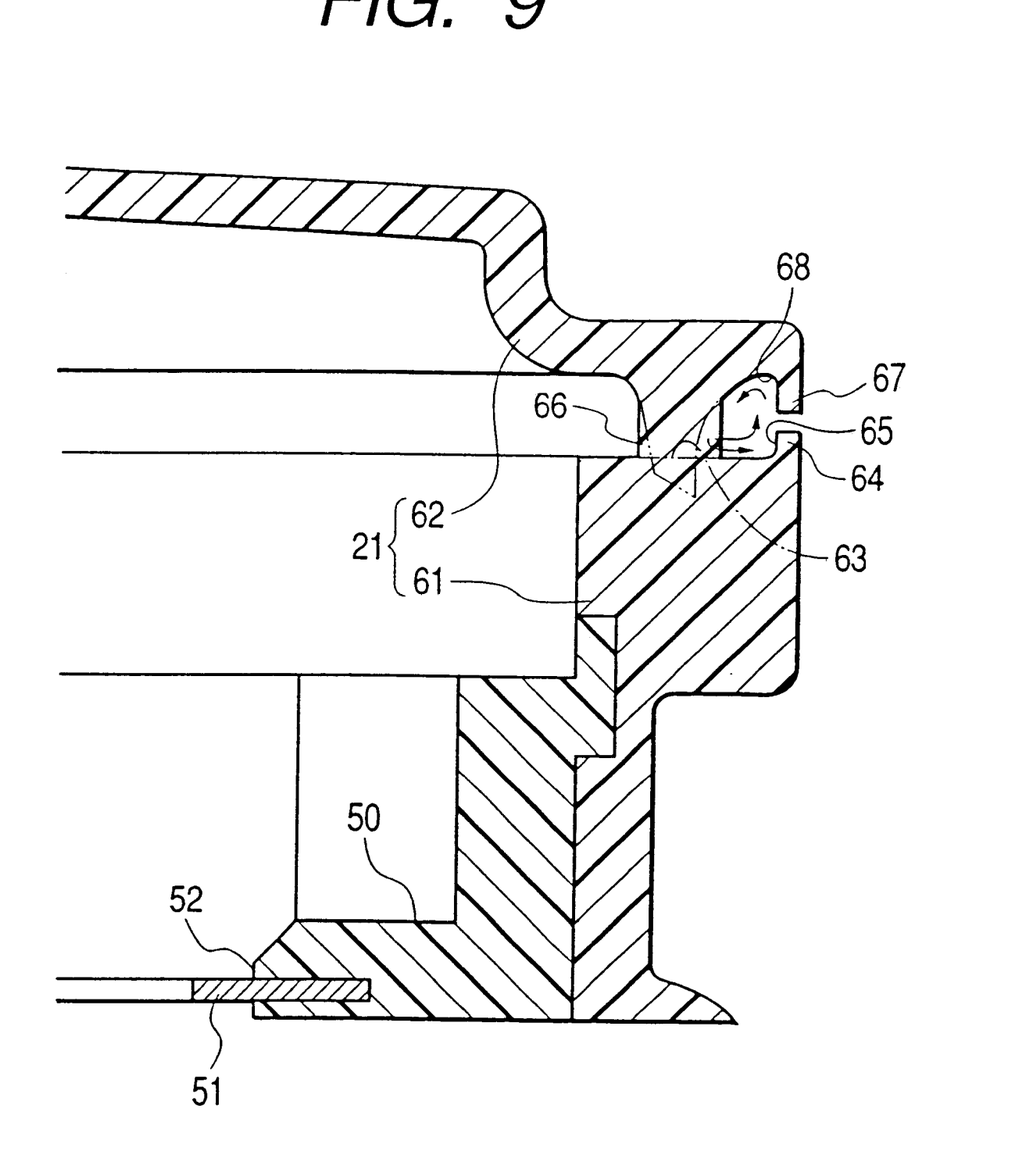
FIG. 9 shows a sectional view of the cover after welding corresponding to FIG. 8.

FIGS. 1 to 9 shown an embodiment of the present invention, in which FIG. 1 is a brake fluid pressure circuit diagram of a brake system for a passenger vehicle, FIG. 2 a side view of a brake fluid pressure control device, FIG. 3 a view seen in a direction indicated by an arrow 3 in FIG. 2, FIG. 4 a view seen in a direction indicated by an arrow 4 in FIG. 2, FIG. 5 a sectional view taken along the line 5—5 in FIG. 4, FIG. 6 a sectional view taken along the line 6—6 in FIG. 4, FIG. 7 a sectional view taken along the line 7—7, FIG. 8 an enlarged vertical sectional view of a main part of a cover before parts of the cover are welded together, and FIG. 9 a sectional view corresponding to FIG. 8 showing the cover after the parts have been welded together.

First of all, in FIG. 1, a tandem-type master cylinder M comprises first and second output ports $1_1$, $1_2$ for generating a brake fluid pressure in response to a pedal pressing force applied by the driver to a brake pedal 2, a brake fluid pressure control device 3 provided between a front left wheel brake B1, a rear right wheel brake B2, a front right wheel brake B3 and a rear left wheel brake B4 and first and second output fluid pressure passages $2_1$, $2_2$ connected individually to the first and second output ports $1_1$, $1_2$, and first and second proportional pressure reduction valves $4_1$, $4_2$ interposed between the brake fluid pressure control device 3 and the rear left and right wheel brakes B2, B4, respectively.

The brake fluid pressure control device 3 comprises first, second, third and fourth normally opened electromagnetic valves $5_1$ to $5_4$ disposed so as to correspond individually to the front left wheel brake B1, rear right wheel brake B2, front right wheel brake B3 and rear left wheel brake B4, first, second, third and fourth check valves $7_1$ to $7_4$ connected, respectively, in parallel to the normally opened electromagnetic valves $5_1$ to $5_4$, first, second, third and fourth normally closed electromagnetic valves $6_1$ to $6_4$ disposed so as to correspond individually to the respective wheel brakes B1 to B4, first and second reservoirs $8_1$, $8_2$ disposed so as to correspond individually to the first and second output fluid pressure passages $2_1$, $2_2$, first and second plunger-type pumps $11_1$, $11_2$ connected, respectively, to the first and second reservoirs $8_1$, $8_2$ via intake valves $10_1$, $10_2$, a single common electric motor 12 for driving both of the pumps $11_1$, $11_2$, first and second dampers $14_1$, $14_2$ connected, respectively, to the first and second pumps $11_1$, $11_2$ via discharge valves $13_1$, $13_2$, first and second orifices $15_1$, $15_2$ disposed, respectively, between the first and second dampers $14_1$, $14_2$ and the first and second output fluid pressure passages $2_1$, $2_2$ and an electronic control unit 16 for controlling operations of the respective normally opened electromagnetic valves $5_1$ to $5_4$, the respective normally closed electromagnetic valves $6_1$ to $6_4$ and the electric motor.

The first normally opened electromagnetic valve $5_1$ is provided between the first output fluid pressure passage $2_1$ and the front left wheel brake B1, the second normally opened electromagnetic valve $5_2$ between the first output fluid pressure passage $2_1$ and the first proportional pressure reduction valve $4_1$, the third normally opened electromagnetic valve $5_3$ between the second output fluid pressure passage $2_2$ and the front right wheel brake B3, and the fourth normally opened electromagnetic valve $5_4$ between the second output fluid pressure passage $2_2$ and the second proportional pressure reduction valve $4_2$.

In addition, the first to fourth check valves $7_1$ to $7_4$ are connected, respectively, in parallel to the normally opened electromagnetic valves $5_1$ to $5_4$ in such a manner as to allow flows of brake fluid from the corresponding wheel brakes B1 to B4 to the master cylinder M.

The first normally closed electromagnetic valve $6_1$ is provided between the front left wheel brake $B_1$ and the first reservoir $8_1$, the second normally closed electromagnetic valve $6_2$ between the first proportional pressure reduction valve $4_1$ and the first reservoir $8_1$, the third normally closed electromagnetic valve $6_3$ between the front right wheel brake $B_3$ and the second reservoir $8_2$, and the fourth normally closed electromagnetic valve $6_4$ between the second proportional pressure reduction valve $4_2$ and the second reservoir $8_2$.

Now, the first normally opened electromagnetic valve $5_1$ cooperates with the first normally closed electromagnetic valve $6_1$ to constitute a first control valve means V1, the second normally opened electromagnetic valve $5_2$ with the second normally closed electromagnetic valve $6_2$ to constitute a second control valve means V2, the third normally opened electromagnetic valve $5_3$ with the third normally closed electromagnetic vale $6_3$ to constitute a third control valve means V3, and the fourth normally opened electromagnetic valve $5_4$ with the fourth normally closed electromagnetic valve $6_4$ to constitute a fourth control valve means V4.

The control valves V1 to V4 constructed as described above are controlled by the electronic control unit 16 so as to establish communications between the master cylinder M and the wheel brakes $B_1$ to $B_4$ and to close communications between the wheel brakes $B_1$ to $B_4$ and the reservoirs $8_1, 8_2$ during a normal braking operation in which there is no possibility that the respective wheels are locked. In other words, the respective normally opened electromagnetic valves $5_1$ to $5_4$ are deenergized to be kept in opened conditions and the respective normally closed electromagnetic valves $6_1$ to $6_4$ are also deenergized to be kept in closed conditions, and a brake fluid pressure outputted from the first output port 11 of the master cylinder M is applied to the front left wheel brake B1 via the normally opened electromagnetic valve $5_1$ and also to the rear right wheel brake B2 via the second normally opened electromagnetic valve 52 and the first proportional pressure reduction valve $4_1$. In addition, a brake fluid pressure outputted from the second output port 12 of the master cylinder M is applied to the front right wheel brake B3 via the third normally opened electromagnetic valve $5_3$ and also to the rear left wheel brake B4 via the fourth normally opened electromagnetic valve $5_4$ and the second proportional pressure reduction valve $4_2$.

When any of the wheels is about to be locked during the above braking operation, of the control valve means V1 to V4 the control valve means corresponding the wheel which is about to be locked is controlled by the electronic control unit 16 so as to close communications between the master cylinder M and the wheel brakes B1 to B4 and to establish communications between the wheel brakes B1 to B4 and the reservoirs $8_1, 8_2$. In other words, of the first to fourth normally opened electromagnetic valves $5_1$ to $5_4$, the normally opened electromagnetic valve corresponding to the wheel which is about to enter into a locked condition is energized to be closed, while of the first to fourth normally closed electromagnetic valves $6_1$ to $6_4$ the normally closed electromagnetic valve corresponding to the wheel in question is energized to be opened, whereby a part of the brake fluid pressure of the wheel which is about to enter into the locked condition is absorbed by either the first reservoir $8_1$ or the second reservoir $8_2$, the brake fluid pressure of the wheel which is about to enter into the locked condition being thereby reduced.

In trying to hold the brake fluid pressures constant, the respective control valves V1 to V4 are controlled by the electronic control unit 16 such that the wheel brakes B1 to B4 are cut off from the master cylinder M and the reservoirs $8_1, 8_2$. In other words, the normally opened electromagnetic valves $5_1$ to $5_4$ are energized to be closed while the normally closed electromagnetic valves $6_1$ to $6_4$ are deenergized to be kept closed. Furthermore, in trying to boost the brake fluid pressures, the normally opened electromagnetic valves $5_1$ to $5_4$ are deenergized to be kept opened and the normally closed electromagnetic valves $6_1$ to $6_4$ are deenergized to be kept closed.

Thus, efficient braking becomes possible without locking the wheels by controlling the respective control valves V1 to V4 by the electronic control unit 16 as described above.

The electric motor 12 is caused to operate by the electronic control unit 16 during an anti-locking control as described above. In conjunction with the operation of the electric motor 12, the first and second pumps $11_1, 11_2$ are driven, and therefore brake fluid absorbed in the first and second reservoirs $8_1, 8_2$ is taken into the first and second pumps $11_1, 11_2$, is then discharged toward the first and second dampers $14_1, 14_2$ and is eventually refluxed to the first and second output fluid pressure passages $2_1, 2_2$ via the first and second orifices $15_1, 15_2$. By a reflux of brake fluid like this an increase in travel of the brake pedal P due to absorption of brake fluid by the first and second reservoirs $8_1, 8_2$ when the brake pedal P is pressed down can be prevented. Moreover, pulsations generated by the discharge pressures of the first and second pumps $11_1, 11_2$ are absorbed by a cooperation between the first and second dampers $14_1, 14_2$ and the first and second orifices $15_1, 15_2$, and therefore there is no risk of the brake pedal operation feeling being deteriorated.

In FIGS. 2 to 4, the brake fluid pressure control device 3 comprises a housing 20 formed of an aluminum alloy or the like into a block-like configuration, and provided in this housing 20 are the first to fourth normally opened electromagnetic valves $5_1$ to $5_4$, the first to fourth normally closed electromagnetic valves $6_1$ to $6_4$ which constitute together with the first to fourth normally opened electromagnetic valves $5_1$ to $5_4$ the control valve means V1 to V4, the first and fourth check valves $7_1$ to $7_4$, the first and second reservoirs $8_1, 8_2$, the first and second dampers $14_1, 14_2$, the first and second orifices $15_1, 15_2$, and the first and second pumps $11_1, 11_2$. In addition, a cover 21 as a resin component is attached to one end surface 20a of the housing 20 and a motor case 22 for the electric motor 12 is attached to the other end surface 20b of the housing 20 which is opposite to the end where the cover 21 is provided.

Referring to FIGS. 5 to 7 together, the first to fourth electromagnetic valves $5_1$ to $5_4$ each comprise a valve portion 5a and a solenoid portion 5b provided continuously with the valve portion 5a, and the respective valve portions 5a . . . are received in four mounting holes 23 . . . formed in an upper portion of the housing 20 in such a manner as to open in the one end surface 20a of the housing 20, and the respective solenoid portions 5b . . . protrude from the one end surface 20a of the housing 20. In addition, the first to fourth normally closed electromagnetic valves $6_1$ to $6_4$ each comprise a valve portion 6a and a solenoid portion 6b provided continuously with the valve portion 6a, and the respective valve portions 6a . . . are received in four mounting holes 24 formed in an upper portion of the housing in such a manner as to open in the one end surface 20a of the housing 20, and the solenoid portions 6b . . . protrude from the one end surface 20a of the housing 20. The mounting holes 23 . . . are formed in the housing 20 in such a manner as to align in a transverse direction, and the mounting holes 24 . . . are formed below the mounting holes 23 in such a manner as to align in the transverse direction. Thus, the first to fourth normally opened electromagnetic valves $5_1$ to $5_4$ and the first to fourth normally closed electromagnetic valves $6_1$ to $6_4$ are mounted in the housing 20 in vertically parallel to each other.

The first reservoir $8_1$ is disposed at a lower portion of the housing 20 at a position corresponding to the control valve means V1, V2 and the second reservoir $8_2$ is disposed at a lower portion of the housing 20 at a position corresponding to the control valve means V3, V4. Thus, as shown in FIG. 5, two reservoirs $8_1, 8_2$ each comprise a bottomed reservoir hole 26 formed in the housing 20 in such a manner as to open in the one end surface 20a of the housing 20, a bottomed cylindrical piston 28 forming a reservoir chamber 27 between a closed end of the reservoir hole 26 and itself and slidably fitted in the reservoir hole 26, a receiver member 29 fitted in an open end portion of the reservoir hole 26, a stop ring 30 attached to an edge of the open end for preventing the receiver member 29 from coming off the reservoir hole 26 and a reservoir spring 31 provided as compressed between the receiver member 29 and the piston 28, the reservoir chambers 27 of the two reservoirs $8_1$, $8_2$ being connected, respectively, to the first and second pumps $11_1$, $11_2$.

The first damper $14_1$ is disposed in the housing 20 at position corresponding to the control valve means V1, V2 and the first reservoir $8_1$ and the second damper $14_2$ is disposed in the housing at a position corresponding to the control valve means V3, V4 and the second reservoir $8_2$.

The two dampers $14_1$, $14_2$ each comprise a piston 35 slidably fitted in a bottomed damper hole 33 formed in the housing in such a manner as to open in the one end surface 20a of the housing so as to form a damper chamber 34 between a closed end of the damper hole 33 and itself, a receiver member 36 fitted in an open end portion of the damper hole 33, a stop ring 37 attached to an edge of the open end portion of the damper hole 33 for preventing the receiver member 36 from coming off the damper hole 33, and one or a plurality of coned disc springs 38 provided as a spring means between the receiver member 36 and the piston 35, the damper chambers 34 . . . of the two dampers $14_1$, $14_2$ being connected to the first and second pumps $11_1$, $11_2$.

The first and second pumps $11_1$, $11_2$ are disposed in the housing 20, respectively, between the first to fourth normally closed electromagnetic valves $6_1$ to $6_4$ and the first and second reservoirs $8_1$, $8_2$ and each have a coaxial operating axis oriented along a direction in which the first to fourth normally closed electromagnetic valves 61 to 64 are arranged, and plungers 40 . . . provided with the respective pumps $11_1$, $11_2$ are disposed at positions that are spaced away from each other. In addition, the two pumps $11_1$, $11_2$ each incorporate therein an intake valve $10_1$, $10_2$ and a discharge valve $13_1$, $13_2$.

The motor case 22 for the electric motor 12 comprises a bottomed cylindrical case main body 22a and a lid body 22b disposed so as to close an open end of the case main body 22a, and the case main body 22a and the lid body 22b are both fastened to the other end surface 20b o the housing 20 with a plurality of screw members 41 . . . An output shaft of the electric motor 12 rotatably penetrates the lid body 22b and extends into a recessed portion 43 formed in the housing 20. The output shaft is supported on a ball bearing 44 held on the lid body 22b and a ball bearing 45 held on an inner end portion of the recessed portion 43. In addition, an eccentric shaft portion 42a is provided on the output shaft 42 at an intermediate portion positioned between the two bearings 44, 45, and a ball bearing 46 mounted around an outer circumference of the eccentric shaft portion 42a abuts with distal ends of the respective plungers 40 . . . of the first and second pumps $11_1$, $11_2$. Therefore, when the output shaft 42 is rotated through operation of the electric motor 12, eccentric motions are imparted to the ball bearing 46 via the eccentric shaft portion 42a, whereby the respective plungers 40 . . . perform pumping operations.

In FIG. 8, the cover 21 comprises a first molded body 61 formed into a cylindrical configuration from a synthetic resin and a second molded body 62 formed from a synthetic resin into a configuration allowing closure of an opening portion of the first molded body 61 formed at one end thereof and vibration welded to the first molded body 61 at the one end thereof.

Referring also to FIG. 9, provided at the end portion where the first molded body 61 is joined to the second molded body 62 an endless flat joint area 63, a first endless regulating projection 64 projecting from an outer edge of the joint area 63 toward the second molded body 62 and a first guide surface 65 connecting an internal side surface of the first regulating projection 64 to the joint area 63.

In addition, provided on an end portion of the second molded body 62 where the second molded body 62 is joined to the first molded body 61 an endless welding projection 66 projecting toward the first molded body 61 in such a manner that a distal end portion thereof is welded to the joint area 63 of the first molded body 61, a second regulating projection 67 projecting from an outer edge of the second molded body 62 toward the first molded body in such a manner as to closely confront the first regulating projection 64 of the first molded body 61 when vibration molding of the welding projection 66 to the joint area 63 is completed, and a second guide surface 68 connecting an external side surface of the welding projection 66 to an internal side surface of the second regulating projection 67.

Note that the distal end of the welding projection 66 has a cross section substantially formed by two lines x, y one of which is inclined relative to a direction z extended perpendicular to the joint area by a first predetermined angle ($\alpha$) and the other of which is extended along or inclined relative to the direction by a second predetermined angle ($\beta$) smaller than the first predetermined angle. Although in the embodiment the second predetermined angle ($\beta$) is made about 0 degree or more, it is possible to modify it into a minus degree. Note that it is advantageous that the second predetermined angle ($\beta$) is set to be about 0 degree, because the burrs can be moved and exposed towards the outside most effectively.

Moreover, the first guide surface 65 is formed as a curved surface which is curved outwardly convexedly in such a manner as to guide a burr produced to project toward the first regulating projection 64 as indicated by an arrow in FIG. 9 as a result of vibration welding of the welding projection 66 to the joint area 63 toward the internal side surface of the regulating projection 67 along the internal side surface of the first regulating projection 64. In addition, the second guide surface 68 is formed as a curved surface which is curved convexedly to a side opposite to the first guide surface 65 in such a manner as to guide the burr guided from the internal side surface of the first regulating projection 64.to the internal side surface of the second regulating projection 67 toward the external side surface of the welding projection 66.

The cover 21 formed as described above is then fastened to the one end surface 20a of the housing with a plurality of screw members 49 . . . in such a manner as to allow not only accommodation therein of the solenoid portions 5a . . . of the first to fourth normally opened electromagnetic valves $5_1$ to $5_4$ and the solenoid portions 6b . . . of the first to fourth normally closed electromagnetic valves $6_1$ to $6_4$ but also formation between the housing 20 and itself of an accommodation chamber 48 to which the receiver members 29 . . . of the first and second reservoirs $8_1$, $8_2$ and the receiver members 36 . . . of the first and second dampers $14_1$, $14_2$ are caused to face. Then, an endless seal member 71 adapted to be brought into spring contact with the one end surface 20a of the housing 20 is mounted on an housing side 20 edge of the cover 21, in other words, the first molded body 61.

Provided in the first molded body 61 of the cover 21 is a support portion 50 in which the respective solenoid portions 5b... of the first to fourth normally opened electromagnetic valves $5_1$ to $5_4$ and the respective solenoid portions 6b... of the first to fourth normally closed electromagnetic valves $6_1$ to $6_4$ are fitted for support thereat, and a plurality of opening portions 52 are formed in the support portion 50 so as not to partition the accommodation chamber 48 with the support portion 50.

The electronic control unit 16 comprises a printed circuit board 53 having printed thereon an electric circuit and a semiconductor chip 54 installed thereon and the printed circuit board 53 is fastened to the support portion 50 on a side opposite to the housing 20 within the cover 21. Moreover, a plurality of conductive metallic bus bars 51... are embedded in the support portion 50, and with these bus bars 51... the respective solenoid portions 5b... of the first to fourth normally opened electromagnetic valves $5_1$ to $5_4$ and the respective solenoid portions 6b... of the first to fourth normally closed electromagnetic valves $6_1$ to $6_4$ are connected to the electronic control unit 16.

An projecting portion 21a projecting sideward from the housing 20 is formed integrally with the cover 21, and a male-type cover side connector 55 is provided in the projecting portion 21a.

This cover side connector 55, comprises a connector housing 56 formed into a box-like configuration integrally with the projecting portion 21a of the cover 21 and a plurality of connector terminals 57... accommodated and supported in the interior of the connector housing 56, and the connector terminals 57... are connected respectively to the respective solenoid portions 5b... 6b... via the electronic control unit 16 and the bus bars 51 and they are also connected to the electric motor 12 via the electronic control unit 16 and an conductive body not shown.

Detachably connected to the cover side connector 55 provided continuously with the cover 21 is a connector housing 77 of an external conductor side connector 76 commonly provided at an end of a plurality of external conductors 75, 75... and connector terminals (not shown) provided in the connector housing 77 in such a manner as to be individually continuous with the external conductors 75, 75... are fitted in the connector terminals 57 of the cover side connector 55 for connection therewith.

Paying attention to FIGS. 2 and 3, fixed to a vehicle body frame 88 is a bracket 89 comprising a support plate portion 89a confronting a lower surface of the housing 20 and a pair of support plate portions 89b, 89b provided at ends of the support plate portion 89a continuously therewith at right angles so as to confront side surfaces of the housing 20.

On the other hand, mounting projections 102, 102 are provided at upper portions on sides of the housing 20 integrally therewith in such a manner as to project therefrom and both the mounting projections 102, 102 are mounted at upper portions of the support plate portions 89b, 89b of the bracket 89 via mounting means 91, 91.

The mounting means 91 comprises a mount bolt 103 having an axis extending substantially horizontally and supported on the support portion 89b and a cylindrical mount rubber 104 for allowing a part of the mount bolt 3 to be fitted thereinto, and there is provided in the mounting projection 102 a bottomed mounting hole 105 into which the mount rubber 104 is fitted.

The mount bolt 103 comprises integrally a threaded shaft portion 103a, a fitting shank portion 103b provided coaxially and integrally with the threaded shaft portion 103a to be continuous therewith and a jaw portion 103c projecting radially outwardly from a portion where the threaded shaft portion 103a and the fitting shank portion 103b are continuously provided. On the other hand, a slit 106 made open upwardly is provided at an upper portion of the support plate 89b and a portion of the threaded shaft portion 103a which is closer to the jaw portion 103c is inserted into the slit 106 from above. Then, a nut 107 is screwed on the threaded shaft portion 103a and the support plate portion 89b is held between the nut 107 and the jaw portion 103c, whereby the mount bolt 103 is fixedly supported on the support plate portion 89b.

In addition, a lower portion of the housing 20 is constructed to be mounted on the support plate portion 89a of the bracket 89 via a mounting means 90, and this mounting means 90 comprises a mount rubber (not shown) fitted in the lower portion of the housing 20, which mount rubber is fixed to the support plate portion 89a.

Next, an operation of the embodiment will be described. The housing 21 is constructed to be formed by vibrating both the molded bodies 61, 62 relative to each other at a high speed with the welding projection 66 of the second molded body 62 being pressed against the joint area 63 of the first molded body 61 at the distal end thereof, whereby the distal end of the welding projection 66 is vibration welded on the joint area 63 by virtue of a friction heat generated between the distal end of the welding projection 66 and the joint area 63. The burrs produced between the distal end of the welding projection 66 and a contact portion of the joint area 63 during the vibration welding those projecting outwardly are constructed to be guided by the first guide surface 65 toward the second regulating projection 67 along the internal side surface of the first regulating projection 64. In addition, the burrs guided from the internal side surface of the first regulating projection 64 toward the internal side surface of the second regulating projection 67 are guided by the second guide surface 68 toward the external side surface of the welding projection 66.

Consequently, this serves to avoid a risk of the burrs being allowed to project outwardly from a gap between the first and second regulating projections 64, 67, and the burrs are confined within a space formed by the joint area 63, the first regulating projection 64, the second regulating projection 67 and the welding projection 66, whereby a risk of burrs being exposed from the external surface of the cover 21 is securely prevented, this contributing to improvement of the commercial value of the cover 21.

Thus, the embodiment of the present invention has been described in detail heretofore, but the present invention is not limited to the above embodiment but may be modified variously without departing the spirit of the present invention which is clearly defined by the range of what is claimed at the beginning of this document.

For instance, although in the above case the present invention is described as being applied to the cover 21 of the brake fluid pressure control device for a passenger vehicle, the present invention is not limited to a cover 21 of that type but may be widely applied to a resin component of any type constructed to be formed by vibration welding first and second molded bodies which are formed from a synthetic resin.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As is described above, according to the present invention, of burrs produced between the distal end of the welding projection and the contact portion of the joint area during the vibration welding the first and second molded bodies those projecting outwardly are constructed to be guided by the first guide surface toward the second regulating projection along the internal side surface of the first regulating projection, and therefore a risk can be avoided in which the burrs are allowed to project outwardly from the gap between the first and second regulating projections, and the burrs so guided are eventually confined within the space formed by the joint area, the first regulating projection, the second regulating projection and the welding projection, whereby a risk of burrs being exposed from the external surface of the resin component is securely prevented, this contributing to improvement of the commercial value of the resin component.

What is claimed is:

1. A resin component comprising:
   a first synthetic resin molded body (61); and
   a second synthetic resin molded body (62) coupled with said first synthetic resin molded body (61) by a vibration welding,
   wherein said first resin molded body (61) includes
      a joint area (63) which is provided at its edge portion where said first molded body (61) is joined to said second molded body (62),
      a first regulating projection (64) which is provided from an outermost edge of said joint area toward said second molded body (62), and
      a first guide surface (65) connecting an internal side surface of said first regulating projection (64) to said joint area (63), and
   wherein said second resin molded body (62) includes
      a welding projection (66) which is projected toward said first molded body (61) so as to be welded at a distal end thereof to said joint area (63) of said first molded body (61) and is provided at its edge portion where said second molded body (62) is jointed to said first molded body (61),
      a second regulating projection (67) which is projected from an outermost edge of said second molded body (62) toward said first molded body (61) so as to closely confront said first regulating projection (64) after a vibration welding operation between said welding projection (66) and said joint area (63) is completed, and
      a second guide surface (68) connecting an external side surface of said welding projection (66) to an internal side surface of said second regulating projection (67),
   wherein said first guide surface (65) is formed into a curve shape to guide a burr produced to project toward said first regulating projection (64) as a result of vibration welding of said welding projection (66) to said joint area (63) toward said internal side surface of said second regulating projection (67) along said internal side surface of said first regulating projection (64), and said second guide surface (68) is curved and located in confront with said first guide surface (65) so as to guide the burr guide from said internal side surface of said first regulating projection (64) to said internal side surface of said second regulating projection (67) toward said external side surface of said welding projection (66).

2. The resin component according to claim 1, wherein each of said joint area (63), said first regulating projection (64), said welding projection (66) and said second regulating projection (67) is formed into an endless shape.

3. The resin component according to claim 1, wherein each of said joint area (63), said first regulating projection (64), said welding projection (66) and said second regulating projection (67) is formed into an endless shape.

4. The resin component of claim 1, wherein the first molded body is welded to the second molded body.

5. A resin component, comprising:
   a first synthetic resin molded body (61); and
   a second synthetic resin molded body (62) coupled with said first synthetic resin molded body (61),
   wherein said first resin molded body (61) includes
      a joint area (63) which is provided at its edge portion where said first molded body (61) is joined to said second molded body (62),
      a first regulating projection (64) which is provided from an outermost edge of said joint area toward said second molded body (62), and
      a first guide surface (65) connecting an internal side surface of said first regulating projection (64) to said joint area (63), and
   wherein said second resin molded body (62) includes
      a welding projection (66) which is projected toward said first molded body (61) so as to be welded at a distal end thereof to said joint area (63) of said first molded body (61) and is provided at its edge portion where said second molded body (62) is joined to said first molded body (61),
      a second regulating projection (67) which is projected from an outermost edge of said second molded body (62) toward said first molded body (61) so as to closely confront said first regulating projection (64), and
      a second guide surface (68) connecting an external side surface of said welding projection (66) to an internal side surface of said second regulating projection (67);
   wherein said distal end of said welding projection (66) has a cross section substantially formed by two lines one of which is inclined relative to a direction extended perpendicular to said joint area (63) by a first predetermined angle ($\alpha$) and the other of which is extended along said direction.

6. A resin component comprising:
   a first synthetic resin molded body (61); and
   a second synthetic resin molded body (62) coupled with said first synthetic resin molded body (61),
   wherein said first resin molded body (61) includes
      a joint area (63) which is provided at its edge portion where said first molded body (61) is joined to said second molded body (62),
      a first regulating projection (64) which is provided from an outermost edge of said joint area toward said second molded body (62), and
      a first guide surface (65) connecting an internal side surface of said first regulating projection (64) to said joint area (63), and
   wherein said second resin molded body (62) includes
      a welding projection (66) which is projected toward said first molded body (61) so as to be welded at a distal end thereof to said joint area (63) of said first molded body (61) and is provided at its edge portion where said second molded body (62) is joined to said first molded body (61), a second regulating projection which is projected from an outermost edge of said second molded body (62) toward said first molded body (61) so as to closely confront said first regulating projection (64), and a second guide surface (68) connecting an external side surface of said welding projection (66) to an internal side surface of said second regulating projection (67);

wherein said distal end of said welding projection (66) has a cross section substantially formed by two lines one of which is inclined relative to a direction extended perpendicular to said joint area (63) by a first predetermined angle ($\alpha$) and the other of which is inclined relative to said direction by a second predetermined angle ($\beta$) smaller than said first predetermined angle.

7. The resin component according to claim 6, wherein said second predetermined angle ($\beta$) is about 0 degrees.

* * * * *